United States Patent
Mak (10) Patent No.: US 12,399,325 B2
(45) Date of Patent: Aug. 26, 2025

(54) FIBER TO SILICON PHOTONICS ASSEMBLY METHOD WITH FIBER RETAINING APPARATUS

(71) Applicant: Cloud Light Technology Limited, Hong Kong (HK)

(72) Inventor: Wing Keung Mark Mak, Hong Kong (HK)

(73) Assignee: Cloud Light Technology Limited, Hong Kong (HK)

( * ) Notice: Subject to any disclaimer, the term of this patent is extended or adjusted under 35 U.S.C. 154(b) by 200 days.

(21) Appl. No.: 18/052,579

(22) Filed: Nov. 4, 2022

(65) Prior Publication Data

US 2023/0152524 A1    May 18, 2023

Related U.S. Application Data

(60) Provisional application No. 63/278,652, filed on Nov. 12, 2021.

(51) Int. Cl.
G02B 6/30    (2006.01)

(52) U.S. Cl.
CPC .................................. G02B 6/30 (2013.01)

(58) Field of Classification Search
None
See application file for complete search history.

(56) References Cited

U.S. PATENT DOCUMENTS

| | | | | |
|---|---|---|---|---|
| 4,830,456 A * | 5/1989 | Kakii | ..................... | G02B 6/389 385/59 |
| 5,481,633 A * | 1/1996 | Mayer | ..................... | G02B 6/30 264/1.24 |
| 7,223,025 B2 * | 5/2007 | Benzoni | .................. | G02B 6/30 385/83 |
| 7,625,132 B2 * | 12/2009 | Benzoni | ............... | G02B 6/4201 385/83 |
| 9,423,561 B1 * | 8/2016 | Chou | ....................... | G02B 6/30 |
| 2002/0196998 A1 * | 12/2002 | Steinberg | ............... | G02B 6/322 385/39 |
| 2004/0264866 A1 * | 12/2004 | Sherrer | ................ | G02B 6/4201 385/76 |
| 2006/0002664 A1 * | 1/2006 | Benzoni | ................. | G02B 6/423 385/88 |
| 2007/0154145 A1 * | 7/2007 | Miyadera | ................. | G02B 6/30 385/50 |
| 2008/0226230 A1 * | 9/2008 | Kuroda | .............. | G02B 6/29361 385/33 |
| 2023/0152524 A1 * | 5/2023 | Mak | ........................ | G02B 6/30 385/52 |

* cited by examiner

*Primary Examiner* — Jerry Rahll
(74) *Attorney, Agent, or Firm* — Harrity & Harrity, LLP (57) ABSTRACT

The present disclosure provides an optical fiber to silicon photonics circuit (PIC) assembly method utilizing a structured fiber retaining apparatus for fiber confinement in which polymer filling volume for adhesion and refractive index matching purpose is reduced. Reduction of polymer volume result in smaller optical alignment change due to polymer material volume changes upon moisture absorption and aging, hence improving assembly reliability. In an embodiment, the assembly method and apparatus, transparent polymer material interfaces between fiber and edged coupler volume reduce more than 50% compares to conventional assembly method.

24 Claims, 5 Drawing Sheets

FIBER TO SILICON PHOTONICS ASSEMBLY METHOD WITH FIBER RETAINING APPARATUS

CROSS-REFERENCE TO RELATED APPLICATION

The present application claims priority from U.S. Provisional Application No. 63/278,652 filed on Nov. 12, 2021, the contents of which are incorporated herein by reference in their entirety.

TECHNICAL FIELD

The present disclosure is generally related to optoelectronic chip assembly. More particularly, the present disclosure relates to a packaging method for fiber to silicon photonics circuit v-grooves assembly.

BACKGROUND

Silicon photonics circuit (PIC) optical input and output through edged coupler (EC) can be realized by butt-coupling to optical fiber with a few micrometers thin transparent resin layer to provide index matching condition for good coupling efficiency. Depend on mode-field-diameter of fiber and EC, requirement for lateral alignment precision is about one micrometer for standard telecom single mode fiber (SMF28). To keep EC and fiber facet without delamination from resin that will cause sufficient change in performance, post-assembly displacement should be less than one micrometer and few micrometers in lateral and longitudinal direction respectively. Such assembly is traditionally carried out by using slow and high in manufacturing cost active alignment process.

Figure 1A:
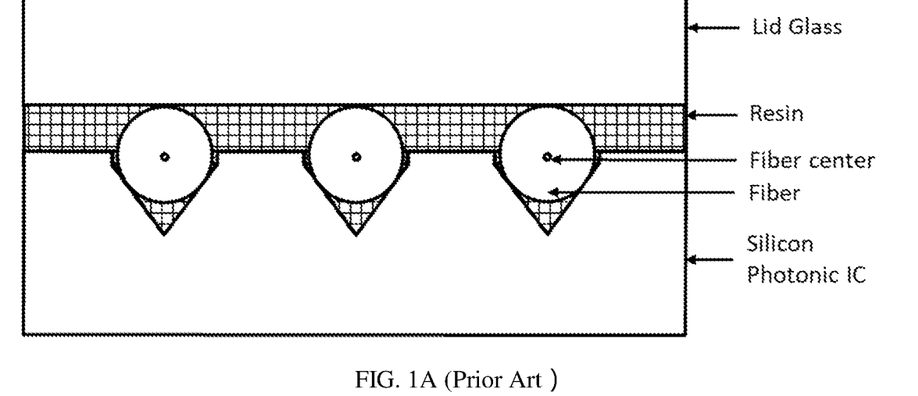
FIGS. 1A-1F illustrate exemplary images showing conventional retaining apparatus including adhesive polymer to retain fiber in Silicon PIC and fiber assemblies, according to technologies in prior art.
Figure 1B:
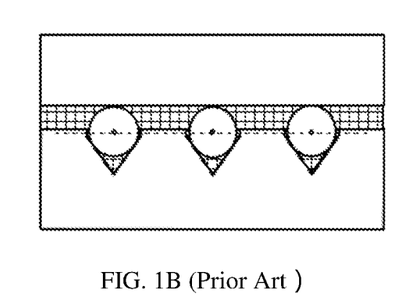
Figure 1C:
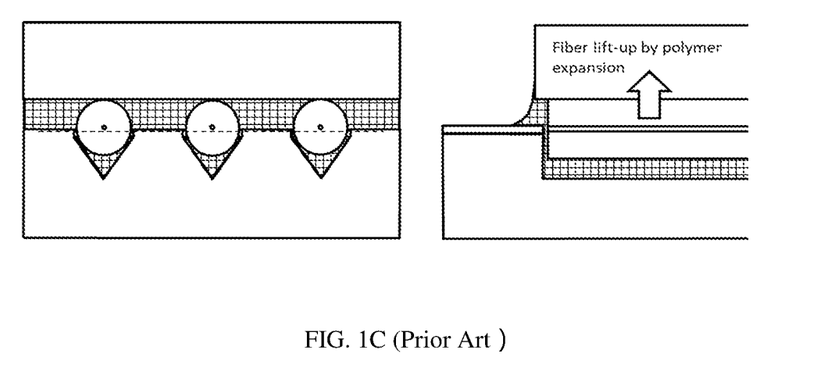
Figure 1D:
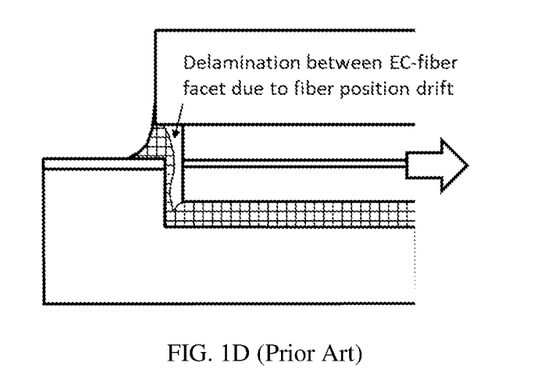

To improve manufacturability, PIC foundry has developed monolithically integrated silicon v-groove structure in which EC and fiber can be aligned passively with suitable assembly process. Successful implementation of the passive fiber assembly with EC can effectively reduce packaging cost, especially for high optical input-output count in parallel single-mode (PSM) optical transceiver. In spite of on PIC v-groove provides basis for passive fiber alignment to EC, assembly development, including and may not limit to factors like availability of refractive index (RI) matched polymer resin, mechanical stability of package against thermal expansion and moisture absorption of resin, polymer adhesive strength to retain fiber alignment throughout service life time;

Make use of the PIC integrated v-groove to silicon photonics, fiber is passively positioned in cavity with lid plate made of glass or ceramic affix on top of it to secure position in vertical and lateral direction. Optical transparent resin is applied to EC and fiber facet to enhance optical transmission. Optical adhesive is usually selected as the filling resin so that fiber is bonded to the v-groove as shown by the conventional structure in FIG. 1A. Just after the assembly process, the initial fiber positioning aligns the fiber centers to the PIC light emission, FIG. 1B. The robustness of optical alignment depends on number of environmental factors and resin properties. One of the commonly known causes of degradation is moisture absorption of resin. Resin properties general changes upon absorption of moisture, for instance volume expansion and reduction of adhesion. Volume expansion will result in upward shift in the fiber alignment as indicated in FIG. 1C and weakened adhesion of fiber to v-groove bonding force allow fiber position drift in longitudinal direction as indicates in FIG. 1D.

Figure 1E:
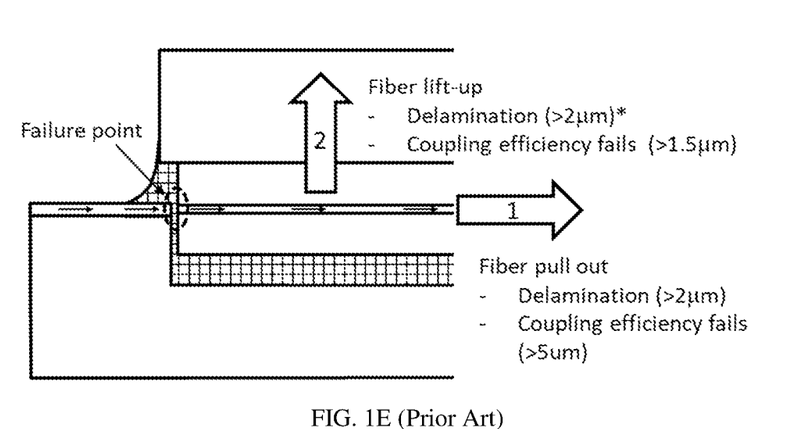

In non-hermitic packaging PSM optical transceiver for example, PIC and v-groove is not shield from ambient environment. So that moisture absorption cannot be avoided. The water absorption rate by polymer matrix follows laws of diffusion. Two main parameters defining water absorption are the equilibrium concentration and the diffusion coefficient. The former is environmental factor such as relative humidity (RH) where the semiconductor device is stored or is working. The second determines time of polymer reaching a certain saturation level. A generic test used by optical communication industry to testify device endurance which includes using the polymer in an assembly under the un-biased damp-heat (uBDH). The test is construed by exposing the unit to 85% RH at 85° C. for a period up to 500 to 1000 hours, for data-communication and tele-communication applications respectively. In photonics packaging, general consensus for EC-to-fiber assembly failure occur due to excessive alignment shift are given in FIG. 1E as reference.

Figure 1F:
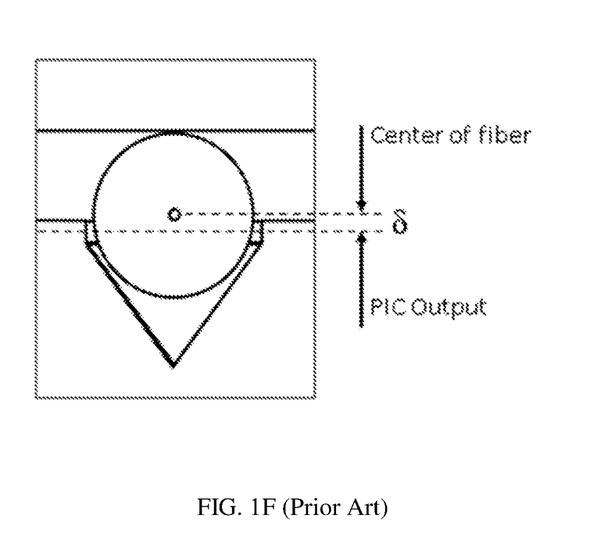

To understand the cause and failure mechanism, we can start by considering misalignment, $\delta$, between the fiber centers and PIC EC by relating the volume change ($\Delta V$) of resin in the planar assembly structure by the equation: (see, FIG. 1F)

$$\delta = \frac{2\Delta V}{3v \cdot \text{Area}} \qquad \text{Eq. 1}$$

where, v is the Poisson ratio and section area (Area) of the resin; $\Delta V$ is related to volume (V) of polymer confined between PIC surface and the top lid and the coefficient of hygroscopic expansion ($\beta$) as follows:

$$\Delta V = V \cdot \beta$$

Thus, as explained, due to moisture absorption, the polymer adhesive expands, which can lead to fiber upward lift and fiber center misalignment with EC as indicated in FIG. 1C. This is a prominent failure mode in alike assembly structure. Hence, it therefore becomes important to address these changes in material properties of adhesive polymers, upon moisture absorption, in present assembly and packaging processes for fiber to silicon photonics, which may lead to failures in their assembly and packaging processes.

SUMMARY

An aspect of the present disclosure provides a fiber retaining apparatus to package and retain an optic fiber in a fiber to silicon photonics assembly, comprising: at least one patterned surface to retain at least one optic fiber assembly; and multiple structures etched on the at least one patterned surface, each one of the multiple structures has a structured shape for retaining at least one optic fiber in the at least one optic fiber assembly assembled in the fiber to silicon photonics assembly; wherein the each one of the multiple structures with the structured shape retains and maintains the at least one optic fiber in a position alignment that aligns a center of the at least one optic fiber with a light output of the silicon photonics, even when the fiber retaining apparatus undergoes changes in material properties of its adhesive polymer material, due to environmental conditions, and material extrinsic and intrinsic changes; and wherein the fiber retaining apparatus reduces volume of the adhesive polymer material used in adhesive to secure the optic fiber to silicon photonics assembly.

An embodiment of the present disclosure provides the fiber retaining apparatus retains the at least one optic fiber in the position alignment in a V-groove of a silicon photonics chip.

An embodiment of the present disclosure provides the changes in the material properties of the adhesive polymer material of the fiber retaining apparatus includes material expansion due to thermal expansion and moisture absorption.

Another embodiment of the present disclosure provides the changes in the material properties of the adhesive polymer material of the fiber retaining apparatus includes material expansion due to environmental conditions including relative humidity, and material extrinsic and intrinsic changes including changes in Poisson ratio, coefficient of Hygroscopic Expansion.

An embodiment of the present disclosure provides the multiple structures etched on the at least one patterned surface of the fiber retaining apparatus includes at least one or more of square, rectangle, deep-V, U-shape, trapezoidal, or hexagon, either individually or in combination.

An embodiment of the present disclosure provides the fiber retaining apparatus is made of a suitable adhesive polymer resin, including acrylic, epoxy.

Yet another embodiment of the present disclosure provides the fiber retaining apparatus reduces the volume of the adhesive polymer material at least more than 50% and improves packaging reliability.

Another aspect of the present disclosure provides a fiber to silicon photonics assembly, comprising: at least one silicon photonics integrated circuit (Si-PIC); at least one optic fiber assembly; at least one v-groove structure in the at least one Si-PIC for coupling with at least one optic fiber in the at least one optic fiber assembly; and at least one fiber retaining apparatus to retain the at least one optic fiber assembly within the v-groove structures in the at least one Si-PIC, wherein the at least one fiber retaining apparatus comprises: at least one patterned surface to retain the at least one optic fiber assembly within the v-groove structures in the at least one Si-PIC; and multiple structures etched on the at least one patterned surface, each one of the multiple structures has a structured shape for retaining the at least one optic fiber in the at least one v-groove structure of the at least one Si-PIC; wherein the each one of the multiple structures with the structured shape retains and maintains the at least one optic fiber in a position alignment that aligns a center of the at least one optic fiber with a light output of the silicon photonics, even when the at least one fiber retaining apparatus undergoes changes in material properties of its adhesive polymer material, due to environmental conditions, and material extrinsic and intrinsic changes; and wherein the at least one fiber retaining apparatus reduces volume of the adhesive polymer material used to secure the at least one optic fiber assembly with the at least one Si-PIC in the fiber to silicon photonics assembly.

Yet another aspect of the present disclosure provides a fiber to silicon photonics assembly, comprising: at least one silicon photonics integrated circuit (Si-PIC); at least one optic fiber assembly; at least one groove in the at least one Si-PIC for coupling with at least one optic fiber in the at least one optic fiber assembly; and at least one fiber retaining apparatus to retain the at least one optic fiber assembly within the grooves in the at least one Si-PIC, wherein the at least one fiber retaining apparatus comprises: at least one patterned surface to retain the at least one optic fiber assembly within the grooves in the at least one Si-PIC; and multiple structures etched on the at least one patterned surface, each one of the multiple structures has a structured shape for retaining the at least one optic fiber in the at least one groove of the at least one Si-PIC; wherein the each one of the multiple structures with the structured shape retains and maintains the at least one optic fiber in a position alignment that aligns a center of the at least one optic fiber with a light output of the silicon photonics, even when the at least one fiber retaining apparatus undergoes changes in material properties of its adhesive polymer material, due to environmental conditions, and material extrinsic and intrinsic changes; and wherein the at least one fiber retaining apparatus reduces volume of the adhesive polymer material used to secure the at least one optic fiber assembly with the at least one Si-PIC in the fiber to silicon photonics assembly.

Another aspect of the present disclosure provides an assembly method for optical fiber to silicon photonic circuit (PIC), comprising: (a) providing a PIC with at least one optical fiber positioning cavity, fabricated on a surface of the PIC, that allows a fiber center to align with an etched coupler; (b) depositing at least one optical fiber in the at least one optical fiber positioning cavity provided on the PIC in (b); (c) positioning a fiber retaining apparatus, including at least a structured surface, in contact with the optical fiber that is deposited on the PIC in (b); and (d) filling intra spaces, that are formed between the at least one optical fiber positioning cavity on the PIC, the at least one optical fiber deposited in the at least one optical fiber positioning cavity in (b) and the fiber retaining apparatus positioned in (c), with a transparent polymer transparent to operation of light of the PIC; and wherein the volume of the transparent polymer filled in the intra spaces in (d) is reduced by at least 50% compared to the volume obtained with a fiber retaining apparatus without a structured surface.

An embodiment of the assembly method discloses the structured surface including at least one or more structures etched on it, each one of the at least one or more structures has a structured shape for retaining at least one optic fiber, and the at least one or more structures has at least one or more shapes including square, rectangle, semi-circle, V, U, trapezoidal, hexagon, either individually or in combination.

Another embodiment of the assembly method includes applying a press force to allow the fiber retaining apparatus firmly contacting with the at least one optical fiber confined on the PIC.

Yet another embodiment of the assembly method includes the transparent polymer is a light or heat curable fluid polymer, and wherein the assembly method further comprises curing the transparent polymer in the intra spaces with light or heat, individually or in combination.

BRIEF DESCRIPTION OF DRAWINGS

For a better understanding of the embodiments of the methods and apparatus described herein, and to show more clearly how they may be carried into effect, references will now be made, by way of example, to the accompanying drawings, wherein like reference numerals represent like elements/components throughout and wherein.

DETAILED DESCRIPTION

This disclosure describes the subject matter for patenting with specificity to meet statutory requirements. However, the description itself is not intended to limit the scope of this patent. The principles described herein may be embodied in many different forms.

Illustrative embodiments of the disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. Like numbers refer to like elements throughout.

To further clarify the advantages and features of the present disclosure, a more elaborate description of the disclosure will be rendered by reference to specific embodiments thereof, which is illustrated in the appended drawings. It is appreciated that these drawings depict only typical embodiments of the disclosure and are therefore not to be considered limiting of its scope.

The present disclosure provides a structured fiber retaining apparatus for a fiber to silicon photonics v-groove assembly.

It is an object of the present disclosure to reduce the volume of polymer used in adhesive to secure the assembly.

Another object of the present disclosure to improve assembly endurance against moisture absorption.

Another object of the present disclosure is to improve assembly endurance against polymer expansion and optical alignment shift induced due to moisture absorption in the assembly.

Another object of the present disclosure is to improve assembly alignment stability by more than 50% polymer volume reduction that can sufficiently improve packaging reliability.

Another object of the present disclosure is to improve adhesive strength to retain fiber alignment, which may worsen upon moisture absorption.

Yet another object of the present disclosure is to avoid delamination of interfaces due to CTE mis-match and adhesive moisture absorption.

An object of the present disclosure is also to simplify process complexity and improve manufacturing throughput.

The present disclosure provides a fiber retaining apparatus to package and retain fiber in Silicon (Si) PIC (photonics integrated circuits) and fiber assemblies. In an embodiment, the fiber retaining apparatus retains the fiber in position in the v-grooves of the Silicon PIC, making the fiber centers aligned with the light output of the Si-PIC, even when the polymer material of the adhesive (e.g., adhesive retainer), used in the fiber to Si-PIC assemblies, undergoes property changes, depending on environmental conditions, e.g., relative humidity, and material extrinsic and intrinsic changes.

The fiber retaining apparatus of the present disclosure has at least one structured surface that is tailored according to different shapes or structures, for example including and not limited shapes or structures like square, rectangle, deep-V, U-, trapezoidal, hexagon, and the like. The structure of the patterned surface is such that it retains the fiber in aligned position to PIC while also accommodates the changes in the polymer material of the adhesive upon environmental conditions. This means the structured fiber retaining apparatus accommodates the changes in the polymer material of the fiber retaining apparatus upon environmental conditions, and material extrinsic and intrinsic changes and also retains the fiber in the aligned position in the fiber to Si-PIC assemblies, when those polymer material changes occur.

The patterned fiber retaining apparatus is in contact with the fiber, and fixes the fiber in aligned position with respect to light output of the Si-PIC. Also, the aligned position is fixed by polymer of the fiber retaining apparatus with respect to fiber and PIC in the assembly. In an embodiment, the patterned fiber retaining apparatus is made of any suitable adhesive polymer, examples including and not limited to acrylic, epoxy, and the like.

It may be apparent to a person skilled in the art that the patterned surface of the fiber retaining apparatus may have any suitable pattern or structure, depending on the design and requirements of the Si-PIC and fiber assemblies, as long as the fiber retaining apparatus maintains the aligned position of the fiber with respect to light output of the Si-PIC even under environmental conditions, and material extrinsic and intrinsic changes, without deviating from the meaning and scope of the present disclosure.

In an embodiment, the patterned fiber retaining apparatus retains the fiber in the v-grooves of the silicon photonics, in fiber to silicon photonics assemblies, even under induced expansion and optical alignment shift due to moisture absorption in the polymer material will not lead to functional failure. Thus, in the present disclosure, as the polymer material of the fiber retaining apparatus expands due to thermal expansion and moisture absorption upon environmental conditions, e.g., relative humidity, and/or material extrinsic and intrinsic changes, the patterned fiber retaining apparatus still retains the fiber in the v-grooves of the silicon photonics, where the fiber centers are still properly aligned with the light output of the Si-PIC, avoiding mis-alignment.

A fiber to silicon photonics v-groove assembly with the present patterned fiber retaining apparatus reduces the volume of polymer used to secure the assembly. Reduction in polymer volume improves assembly endurance against moisture absorption induces expansion and optical alignment shift. In addition to reduction of polymer volume in assembly, patterned fiber retaining apparatus makes the moisture ingression path from edge into interior polymer indirect and reluctance. That will slow down moisture absorption of polymer and enhance device reliability.

Figure 2A:
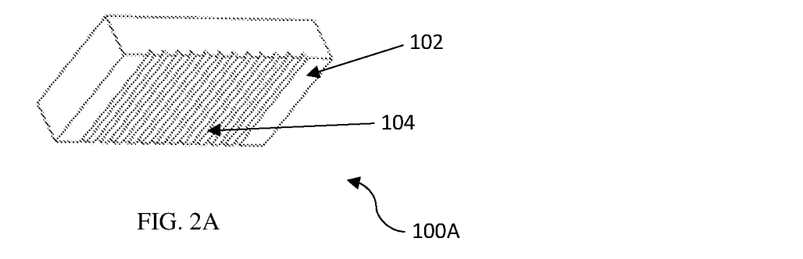
FIGS. 2A-2B illustrate different exemplary line diagrams for showing a fiber retaining apparatus to retain fiber in Silicon PIC and fiber assemblies, in accordance with an embodiment of the present disclosure.
Figure 2B:
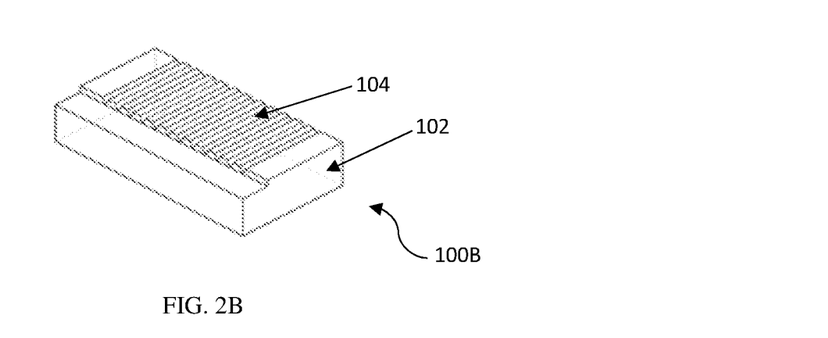

Referring to FIGS. 2A-2B, the structured fiber retaining apparatus (e.g., 100A/100B) includes at least one patterned surface 102, with a multiple patterned structures 104 etched on the surface 102. The patterned structures 104 may be of any suitable shape for example including and not limited to square, rectangle, deep-V, U-shape, trapezoidal, hexagon, and the like. The shape/structure 104 of the patterned surface 102 is such that it accommodates the changes in the polymer material of the fiber retaining apparatus upon environmental conditions, and material extrinsic and intrinsic changes and also retains the fiber in the aligned position in the fiber to Si-PIC assemblies, when those polymer material changes occur.

Also, due to the structured fiber retaining apparatus, the volume of polymer used to secure the assembly can be reduced. Such reduction in polymer volume improves assembly endurance against moisture absorption that can further reduce expansion and optical alignment shift.

Figure 4:
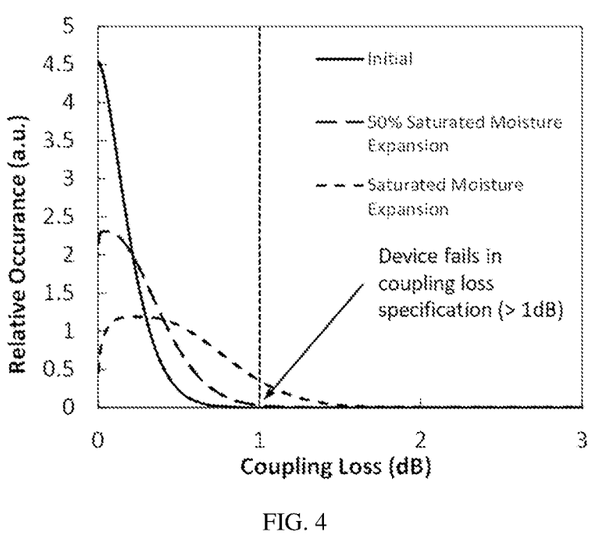
FIG. 4 illustrates an exemplary computation result showing the alignment change distribution influence by moisture absorption with different saturation percentages.

In an embodiment, with the disclosed structured fiber retaining apparatus, more than 50% polymer volume reduction is demonstrated that can sufficiently improve packaging reliability. FIG. 4 shows a modelled case for change in optical coupling loss distribution of PIC coupling to SMF28 fiber in a product. Computation refers to material parameters of a commonly use optical epoxy A in photonic packaging with saturated moisture absorption expansion=0.6% and Poisson ratio=0.32. Taking −1 dB optical power change, in this case the power drop, from GR468 fiber communication reliability standard as failure criteria, it can be seen that with 50% polymer volume reduction can essentially avoid application failure caused by moisture absorption in product application.

Figure 3A:
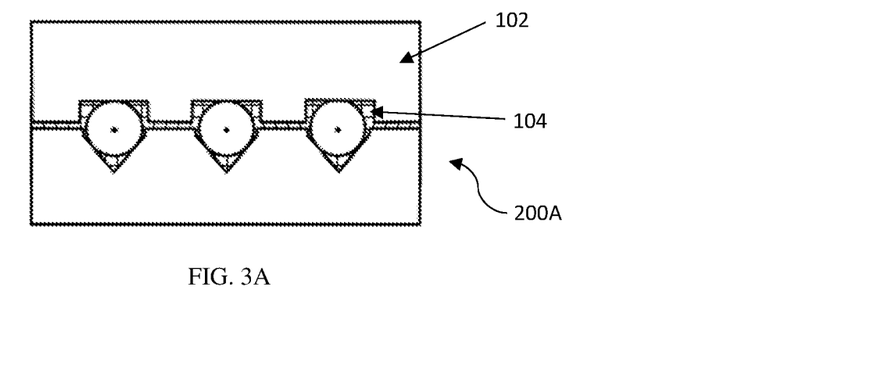
FIGS. 3A-3C illustrate different exemplary structures for showing a fiber retaining apparatus to retain fiber in Silicon PIC and fiber assemblies with different etching structures, in accordance with an embodiment of the present disclosure.
Figure 3B:
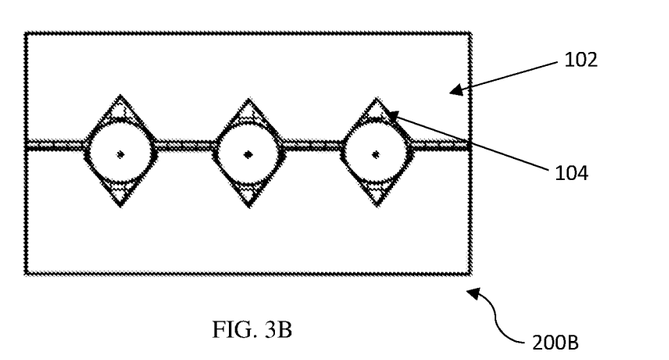
Figure 3C:
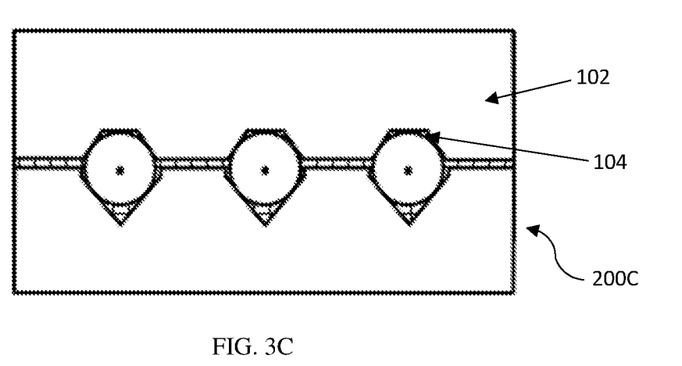

FIGS. 3A-3B illustrates examples of different structures 104 of the patterned surface 102 of the fiber retaining apparatus, for example, FIG. 3A shows the fiber retaining apparatus with a square like structure 104 of the patterned surface 102 with a 50% polymer volume reduction; FIG. 3B shows the fiber retaining apparatus with a deep-V like structure 104 of the patterned surface 102 with a 70% polymer volume reduction; and FIG. 3C shows the fiber retaining apparatus with a trapezoidal like structure 104 of the patterned surface 102 with a 85% polymer volume reduction, in accordance with different embodiments of the present disclosure.

It may be apparent to a person skilled in the art that the patterned fiber retaining apparatus may be implemented to retain the fiber in fiber to Si-PIC assemblies, not only with V grooves, but may be implemented in other semiconductor assemblies to package and retain a component of the semiconductor assemblies in a proper required alignment, without deviating from the meaning and scope of the present disclosure.

Figure 5:
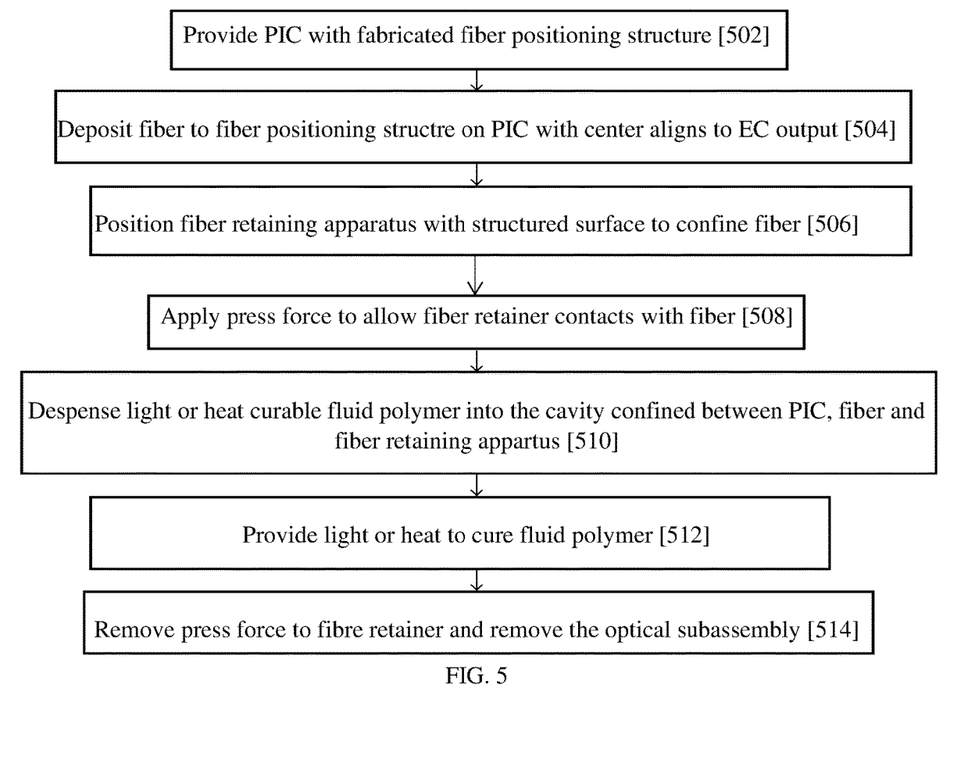
FIG. 5 illustrates an exemplary assembly procedure to align optical fiber to PIC, in accordance with an embodiment of the present disclosure.

FIG. 5 illustrates an exemplary flowchart showing an optical fiber to silicon photonics circuit (PIC) assembly procedure to align optical fiber to PIC using the fiber retaining structure, in accordance with an embodiment of the present disclosure. At a step 502, the PIC is provided with a fabricated fiber positioning structure. At a step 504, a fiber is deposited into the fiber positioning structure on PIC with fiber center aligning to EC (edge coupler) output, or the light output of the Si-PIC. At a further step 506, the fiber retaining apparatus including the structure surface is positioned appropriately such that its structure surface confines the fiber on the Si-PIC assembly. Thereafter, at a step 508, a press force may be applied to allow the fiber retaining apparatus contacting with the fiber confined on the Si-PIC. At a step 510, a light or heat curable fluid polymer is dispended into the cavity confined between the PIC, the fiber and the fiber retaining apparatus, in accordance with an embodiment. After dispensing the fluid polymer, light or heat is provided to cure the fluid polymer, at a step 512. Thereafter, the press force applied previously in step 508 to the fiber retaining apparatus, is removed now and also, the optical subassembly is removed, at step 514.

Thus, the method in FIG. 5 provides an optical fiber to silicon photonics circuit (PIC) assembly procedure to align optical fiber to PIC using the fiber retaining structure which is shown in the FIGS. 2A-B and 3A-C above.

It may be apparent to a person skilled in the art that the steps 502-514 may follow the shown order and/or any variations to the order may also take place in the method, e.g., including a new conventional step or excluding a step from steps 502-514, without any deviation from the meaning and scope of the present disclosure.

Advantageously, the present structured fiber retaining apparatus for a fiber to silicon photonics v-groove assembly retains the fiber in correct alignment, the fiber centers aligned with the light output of the Si-PIC even under any type of changes in surrounding environment or in material properties. The fiber retaining apparatus reduces the volume of polymer used in adhesive to secure the assembly. It also improves the assembly's endurance against moisture absorption, and against polymer expansion and optical alignment shift induced due to moisture absorption in the assembly due to the structures present on its patterned surface.

Further it improves polymer reduction to more than 50% polymer volume reduction, compared to that by using conventional flat surface fiber retainers. The present patterned retainer can sufficiently improve packaging reliability. Additionally, the fiber retaining apparatus also improves the strength of the polymer adhesive, that is used to make the fiber retaining apparatus, to retain fiber alignment, which may worsen upon moisture absorption.

Additionally, the fiber retaining apparatus avoids delamination of interfaces due to CTE mis-match and adhesive moisture absorption and also avoids bubble trapping.

The fiber retaining apparatus is also to simplify process complexity and improve manufacturability.

It is intended that the disclosure and examples be considered exemplary only. Though the present disclosure includes examples from semiconductors chips or assembly, the fiber retaining apparatus architecture disclosed herein may be employed for various applications as would be appreciated by one skilled in the art. The references to devices and structures used here are intended to be applied or extended to the larger scope and should not be construed as restricting the scope and practice of the present disclosure.

While certain embodiments have been described, these embodiments have been presented by way of example only, and are not intended to limit the scope of the present disclosure. Indeed, the novel methods, devices, and systems described herein may be embodied in a variety of other forms. Furthermore, various omissions, substitutions, and changes in the form of the methods, devices, and systems described herein may be made without departing from the spirit of the present disclosure.

The invention claimed is:

1. A fiber retaining apparatus to package and retain an optic fiber in a fiber to silicon photonics assembly, comprising:
at least one patterned surface configured to retain at least one optic fiber assembly;
multiple structures etched on the at least one patterned surface, each structure of the multiple structures having a shape configured to retain at least one optic fiber of the at least one optic fiber assembly in a position alignment that aligns a center of the at least one optic fiber with a light output of silicon photonics when the fiber retaining apparatus undergoes changes in material properties of an adhesive polymer material, due to environmental conditions, and material extrinsic and intrinsic changes,
wherein the shape includes at least one of a square, a rectangle, a trapezoid, or a hexagon; and the adhesive polymer material deposited within the multiple structures,
wherein a volume of the adhesive polymer material deposited within the multiple structures causes an optical coupling loss to be less than 1 decibel (dB) if the adhesive polymer material is moisture saturated.

2. The fiber retaining apparatus of claim 1, wherein the fiber retaining apparatus is configured to retain the at least one optic fiber in the position alignment in a V-groove of a silicon photonics chip.

3. The fiber retaining apparatus of claim 1, wherein the changes in the material properties of the adhesive polymer material include material expansion due to thermal expansion and moisture absorption.

4. The fiber retaining apparatus of claim 1, wherein the environmental conditions include relative humidity, and the material extrinsic and intrinsic changes include changes in one or more of a Poisson ratio or a coefficient of Hygroscopic Expansion.

5. The fiber retaining apparatus of claim 1, wherein the adhesive polymer material is deposited between optic fibers of the at least one optic fiber assembly.

6. The fiber retaining apparatus of claim 1, wherein the adhesive polymer material includes one or more of acrylic or epoxy.

7. A fiber to silicon photonics assembly, comprising:
at least one silicon photonics integrated circuit (Si-PIC);
at least one optic fiber assembly;
at least one v-groove structure in the at least one Si-PIC for coupling with at least one optic fiber in the at least one optic fiber assembly; and
at least one fiber retaining apparatus configured to retain the at least one optic fiber assembly within the at least one v-groove structure, wherein the at least one fiber retaining apparatus comprises:
at least one patterned surface configured to retain the at least one optic fiber assembly within the at least one v-groove structure;
multiple structures etched on the at least one patterned surface, each structure of the multiple structures having a shape configured to retain the at least one optic fiber in the at least one v-groove structure and in a position alignment that aligns a center of the at least one optic fiber with a light output of silicon photonics when the at least one fiber retaining apparatus undergoes changes in material properties of an adhesive polymer material, due to environmental conditions, and material extrinsic and intrinsic changes; and
the adhesive polymer material deposited within the multiple structures,
wherein a volume of the adhesive polymer material deposited within the multiple structures causes an optical coupling loss to be less than 1 decibel (dB) if the adhesive polymer material is 50% moisture saturated.

8. The fiber to silicon photonics assembly of claim 7, wherein the volume of the adhesive polymer material deposited within the multiple structures causes relative occurrence of the optical coupling loss greater than 1 dB to be less than 0.5% if the adhesive polymer material is moisture saturated.

9. The fiber to silicon photonics assembly of claim 7, wherein the changes in the material properties of the adhesive polymer material include material expansion due to thermal expansion and moisture absorption.

10. The fiber to silicon photonics assembly of claim 7, wherein the environmental conditions include relative humidity, and the material extrinsic and intrinsic changes include changes in one or more of a Poisson ratio or a coefficient of Hygroscopic Expansion.

11. The fiber to silicon photonics assembly of claim 7, wherein the shape includes at least one of a square shape, a rectangle shape, a V-shape, a U-shape, a trapezoidal shape, or a hexagonal shape.

12. The fiber to silicon photonics assembly of claim 7, wherein the adhesive polymer material includes one or more of acrylic or epoxy.

13. A fiber to silicon photonics assembly, comprising:
at least one silicon photonics integrated circuit (Si-PIC);
at least one optic fiber assembly;
at least one groove in the at least one Si-PIC for coupling with at least one optic fiber in the at least one optic fiber assembly; and
at least one fiber retaining apparatus configured to retain the at least one optic fiber assembly within the at least one groove, wherein the at least one fiber retaining apparatus comprises:
at least one patterned surface to retain the at least one optic fiber assembly within the at least one groove;
multiple structures etched on the at least one patterned surface, each structure of the multiple structures having a shape configured to retain the at least one optic fiber in the at least one groove and in a position alignment that aligns a center of the at least one optic fiber with a light output of silicon photonics when the at least one fiber retaining apparatus undergoes changes in material properties of an adhesive polymer material, due to environmental conditions, and material extrinsic and intrinsic changes; and
the adhesive polymer material deposited within the multiple structures,
wherein a volume of the adhesive polymer material deposited within the multiple structures causes relative occurrence of optical coupling loss greater than 1 decibel (dB) to be less than 0.5% if the adhesive polymer material is moisture saturated.

14. The fiber to silicon photonics assembly of claim 13, wherein the adhesive polymer material includes one or more of acrylic or epoxy.

15. The fiber to silicon photonics assembly of claim 13, wherein the fiber retaining apparatus is configured to retain the at least one optic fiber in the position alignment in a V-groove of the at least one Si-PIC.

16. The fiber to silicon photonics assembly of claim 13, wherein the changes in the material properties of the adhesive polymer material include material expansion due to thermal expansion and moisture absorption.

17. The fiber to silicon photonics assembly of claim 13, wherein the environmental conditions include relative humidity, and the material extrinsic and intrinsic changes include changes in one or more of a Poisson ratio or a coefficient of Hygroscopic Expansion.

18. The fiber to silicon photonics assembly of claim 13, wherein the shape includes at least one of a square shape, a rectangle shape, a V-shape, a U-shape, a trapezoidal shape, or a hexagonal shape.

19. An assembly method for optical fiber to silicon photonic circuit (PIC), comprising:
providing a PIC with at least one optical fiber positioning cavity, fabricated on a surface of the PIC, that allows a fiber center to align with an etched coupler;
depositing at least one optical fiber in the at least one optical fiber positioning cavity;

positioning a fiber retaining apparatus, including at least a structured surface, to be in contact with the at least one optical fiber; and filling intra spaces, that are formed between the at least one optical fiber positioning cavity on the PIC, the at least one optical fiber, and the fiber retaining apparatus, with a transparent polymer transparent to operation of light of the PIC, wherein a volume of the transparent polymer filled in the intra spaces causes relative occurrence of an optical coupling loss greater than 1 decibel (dB) to be less than 0.1% if the transparent polymer is 50% moisture saturated.

20. The assembly method of claim 19, wherein the transparent polymer is a light or heat curable fluid polymer, and wherein the assembly method further comprises curing the transparent polymer in the intra spaces with light or heat, individually or in combination.

21. The assembly method of claim 19, wherein the volume of the transparent polymer filled in the intra spaces causes the relative occurrence of the optical coupling loss greater than 1 dB to be less than 0.5% if the transparent polymer is moisture saturated.

22. The assembly method of claim 19, wherein the structured surface includes one or more structures etched on a surface of the fiber retaining apparatus, each structure of the one or more structures having a shape for retaining the at least one optic fiber.

23. The assembly method of claim 22, wherein the shape includes at least one of a square shape, a rectangle shape, a V-shape, a U-shape, a trapezoidal shape, or a hexagonal shape.

24. The assembly method of claim 19, further comprising applying a press force to the fiber retaining apparatus when the fiber retaining apparatus is in contact with the at least one optical fiber.

* * * * *